United States Patent [19]
Taneja

[11] Patent Number: 5,774,359
[45] Date of Patent: Jun. 30, 1998

[54] METHOD FOR GENERATING AN EXTENDED ROLLING BALL FILLET SURFACE BETWEEN TWO SURFACES

[75] Inventor: Sanjeev K. Taneja, Bloomfield, Mich.

[73] Assignee: Autodesk, Inc., San Rafael, Calif.

[21] Appl. No.: 714,844

[22] Filed: Sep. 17, 1996

[51] Int. Cl.$^6$ .............................. G06F 19/00; G06T 17/00
[52] U.S. Cl. ............... 364/191; 364/468.04; 364/474.29; 345/442; 345/420
[58] Field of Search ......................... 364/468.04, 474.24, 364/474.28, 474.29, 191, 192, 193; 395/142, 143, 141, 119, 120, 964

[56] References Cited

U.S. PATENT DOCUMENTS

| | | | |
|---|---|---|---|
| 4,491,906 | 1/1985 | Kishi et al. | 364/191 |
| 4,523,270 | 6/1985 | Kishi et al. | 364/191 |
| 4,821,214 | 4/1989 | Sederberg | 395/120 |
| 4,829,456 | 5/1989 | Joonishi et al. | 395/119 |
| 5,119,309 | 6/1992 | Cavendish et al. | 364/474.24 |
| 5,251,160 | 10/1993 | Rockwood et al. | 364/578 |
| 5,345,546 | 9/1994 | Harada et al. | 395/142 |
| 5,410,645 | 4/1995 | Ooka et al. | 395/142 |
| 5,566,281 | 10/1996 | Tokumasu et al. | 395/142 X |
| 5,594,852 | 1/1997 | Tankelevich | 395/142 X |
| 5,619,625 | 4/1997 | Konno et al. | 395/141 X |

OTHER PUBLICATIONS

Barnhill, R.E., et al., "Constant–radius blending of parametric surfaces", *Geometric Modeling*, Springer–Verlag, vol. 8, 1993, 1–20.

Choi, B.K., et al., "Constant–radius blending in surface modeling", *Computer–Aided–Design*, vol. 21, No. 4 May 1989, (see entire document).

Hermann, T., "Rolling ball blends, self intersection", *Curves and Surfaces in Computer Vision and Graphics III*, 1992.

Klass, R., et al., "Fillet and surface intersections defined by rolling balls", *Computer Aided Geometric Design*, vol. 9, No. 3, Aug. 1992, 185–193.

Rossignac, J.R., et al., "Constant–radius blending in solid modeling", *Comput. in Mech. Eng.*, vol. 3, No. 1, Jul. 1984, pp. 65–73.

Sanglikar, M.A., et al., "Modeling rolling ball blends for computer aided geometric design", *Computer Aided Geometric Design*, vol. 7, No. 5, 1990, pp. 399–414.

Varady, T., "Rolling ball blends in solid modelling", *Proc. of 3rd International IFIP Conference of Computer Applications in Production & Engineering*, 1989, pp. 295–309.

*Primary Examiner*—Joseph Ruggiero
*Attorney, Agent, or Firm*—Merchant, Gould, Smith, Edell, Welter & Schmidt

[57] ABSTRACT

A method, apparatus and article of manufacture for generating an extended fillet surface with a computer which smoothly connects two base surfaces together based on the boundary curve of intersection between an offset of the first surface and an envelope of the second surface. An offset surface for the first base surface is created at a distance equal to the fillet radius. An envelope surface for a boundary curve of the second base surface is created and its intersection with the offset surface is determined. A spine curve is fitted to the intersection and contact curves projected onto the first and second surfaces according to the spine curve. A set of arcs is then generated between the contact curves where an endpoint of each arc within the set is tangent to the first base surface. The extended fillet surface is then constructed from the set of arcs being first-order geometric continuous ($G_1$) to only one of the base surfaces.

18 Claims, 8 Drawing Sheets

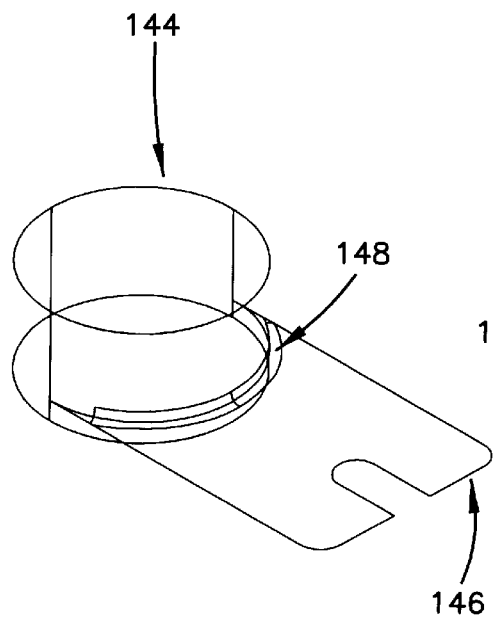 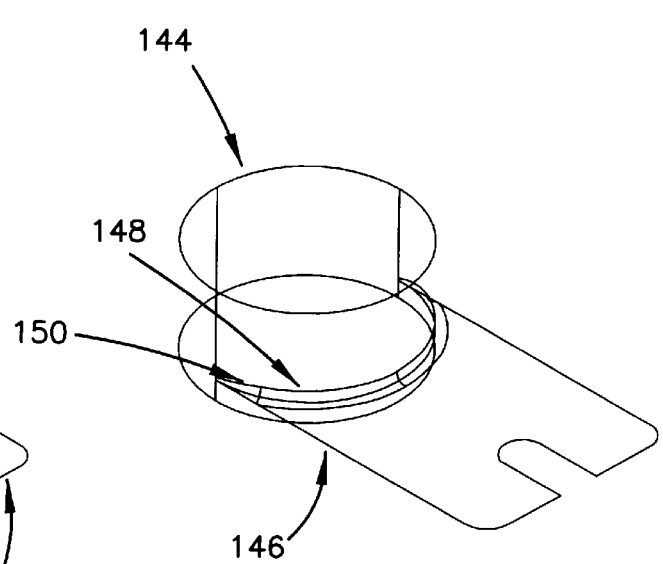
FIG. 4A  FIG. 4B
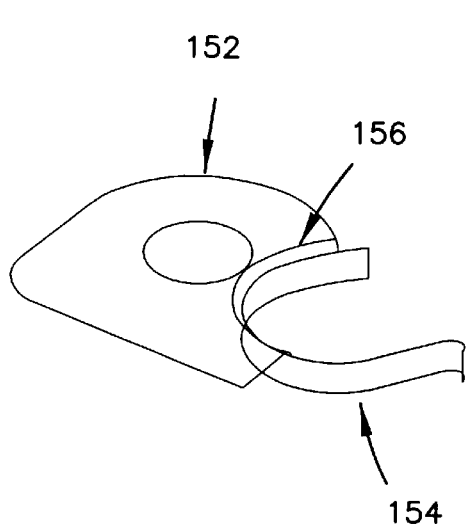 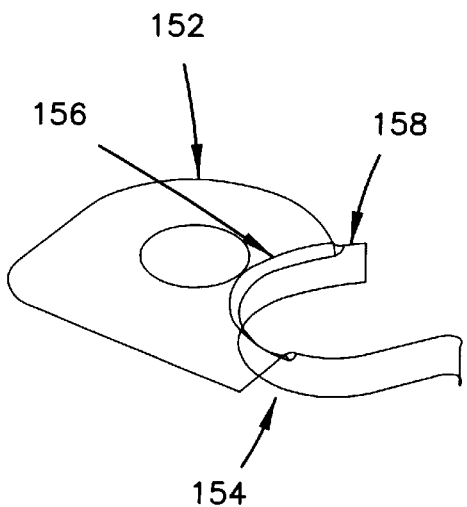
FIG. 5A  FIG. 5B $$q_2 = q_1 + \frac{\sqrt{b}}{\sqrt{a} + \sqrt{b}}$$

$$a = |X_{21} - X_{20}|$$
$$b = |X_{22} - X_{21}|$$

METHOD FOR GENERATING AN EXTENDED ROLLING BALL FILLET SURFACE BETWEEN TWO SURFACES

BACKGROUND OF THE INVENTION

1. Field of the Invention

This invention relates in general to three dimensional (3D) computer aided design (CAD) systems, and more particularly, to a method, apparatus and article of manufacture for generating an extended rolling ball fillet surface between two surfaces.

2. Description of Related Art

Fillet surfaces are used in 3D CAD systems to smoothly join surfaces, which otherwise would meet in sharp edges. Fillets are created for a variety of reasons including aesthetics and strength of the surfaces.

In the rolling ball fillet method, a virtual ball with a radius equal to the fillet radius is placed in contact with the two surfaces and then rolled along the joint, keeping in contact with both surfaces. The motion of the ball creates a family of surfaces corresponding to each instance of the ball. The fillet surface is subsequently generated from the envelope surface of this family of surfaces. The center of the rolling ball moves along a spine curve, which is the intersection curve of the two surfaces formed by offsetting each base surface by the radius of the ball. Several researchers have performed work on methods for generating rolling ball fillet surfaces, as reflected by the following publications:

Barnhill, R. E., et. al., "Constant-radius blending of parametric surfaces", *Geometric Modeling*, Springer-Verlag, 1993 [BARNHILL];

Choi, B. K., et. al., "Constant-radius blending in surface modeling", *Computer-Aided-Design*, no. 8, 1989 [CHOI];

Hermann, T., "Rolling ball blends, self intersections", *Curves and Surfaces in Computer Vision and Graphics III*, 1992 [HERMANN]; Klass, R., et. al., "Fillet and surface intersections defined by rolling balls", *Computer Aided Geometric Design*, no. 9, 1992 [KLASS];

Rossignac, J. R., et. al., "Constant-radius blending in solid modeling", *Comput. Mech. Eng.*, no. 3, 1984 [ROSSIGNAC];

Sanglikar, M. A., et. al., "Modeling rolling ball blends for computer aided geometric design", *Computer Aided Geometric Design*, no. 7, 1990 [SANGLIKAR]; and Varady, T., "Rolling ball blends in solid modeling", *Proc. of 3rd International IFIP Conference of Computer Applications in Production & Engineering*, 1989 [VARADY].

The rolling ball algorithms given by these publications have mostly been developed independently, but share several similar features. In all cases, surfaces are generated which join the base surfaces with first-order geometric continuity ($G_1$).

In [VARADY], a "geometric marching" method for a rolling ball fillet is described. A sequence of blending arcs is obtained from consecutive ball positions. The fillet is created from these blending arcs. In [KLASS] and [HERMANN], a geometric marching method is also used with additional computation for the tangents to the trimlines at each ball position. In [CHOI], general parametric surfaces are used as base surfaces. The blend is represented in a parametric form where multiple mapping with substitution is applied. In [ROSSIGNAC], the rolling ball blends are represented in approximate form as a sequence of a sphere, cylinder and torus.

For aesthetic reasons, the $G_1$ continuity is preferred when joining surfaces, and thus a rolling ball fillet method meets this requirement very well. However this conventional approach leads to incomplete fillets created only as far as the intersection curve goes, or as far as the $G_1$ continuity is maintained. Incomplete fillets created only as far as the intersection curve are shown in FIG. 1A, FIG. 2A, FIG. 3A and FIG. 4A. Even though the previously known methods generate a $G_1$ continuous fillet, the ends of fillet stop abruptly, typically leaving a gap which needs to be filled in by a surface created by some other method. Therefore, there is a need for a way to generate an extended rolling ball fillet surface between two surfaces.

SUMMARY OF THE INVENTION

To overcome the limitations in the prior art described above, and to overcome other limitations that will become apparent upon reading and understanding the present specification, the present invention discloses a method, apparatus and article of manufacture for generating an extended fillet surface with a computer that smoothly connects two base surfaces together based on the boundary curve of intersection between an offset of the first surface and an envelope of the second surface. An offset surface for the first base surface is created at a distance equal to the fillet radius. An envelope surface for a boundary curve of the second base surface is created and its intersection with the offset surface is determined. A spine curve is fitted to the intersection and contact curves projected onto the first and second surfaces according to the spine curve. A set of arcs is then generated between the contact curves where an endpoint of each arc within the set is tangent to the first base surface. The extended fillet surface is then constructed from the set of arcs being first-order geometric continuous ($G_1$) to only one of the base surfaces.

The general object of the present invention is to come up with a useful method for generating fillets which eliminates the disadvantage of current rolling ball fillets. The specific object of the invention is to provide a method for extending rolling ball fillets to the outside boundary curves of both the surfaces.

The extended fillet can be cut by the same spherical tool as the rolling ball fillet, which leads to smooth blends by numerically controlled (NC) cutter paths and improved productivity in cutter path generation.

BRIEF DESCRIPTION OF THE DRAWINGS

FIG. 4 is a perspective drawing which shows a rolling ball fillet created by existing techniques and an extended fillet compatible with the present invention;

FIG. 5 is a perspective drawing which shows a rolling ball fillet created by existing techniques and an extended fillet compatible with the present invention;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Hardware Environment

Figure 1:
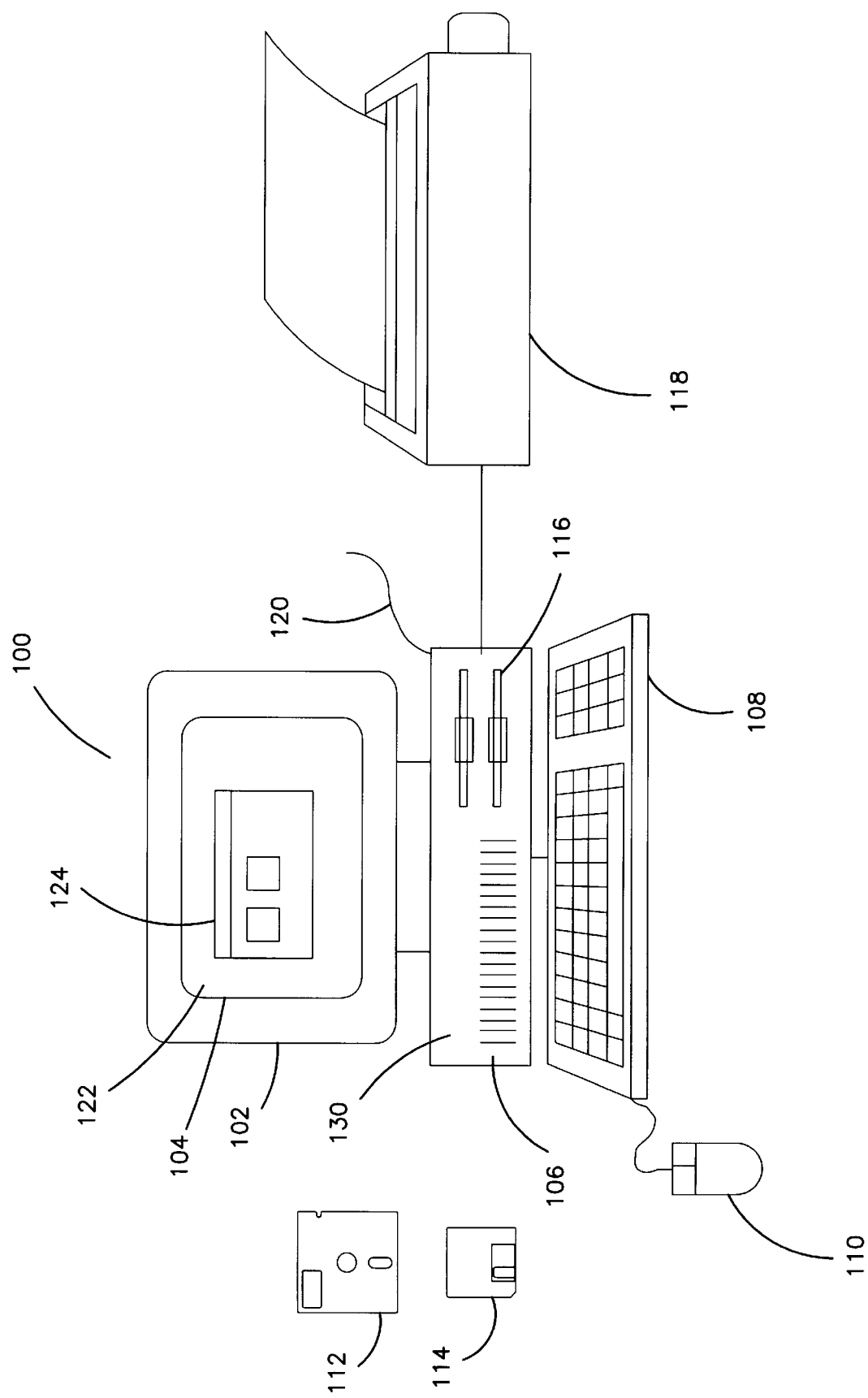
FIG. 1 illustrates an exemplary computer hardware environment that could be used with the present invention.

FIG. 1 illustrates an exemplary computer hardware environment that could be used with the present invention. In the exemplary environment, a computer system 100 comprises a computer 106 coupled to I/O devices comprising a monitor 102, a keyboard 108, a mouse device 110, and a printer 118. The computer 106 could also be coupled to other I/O devices, including a local area network (LAN) or wide area network (WAN) via interface cable 120. The monitor 102 presents a display 104 visually depicting information from the computer system 100 to the user.

The computer 106 comprises a processor and a memory including random access memory (RAM), read only memory (ROM), and/or other components. The computer 106 operates under control of an operating system 122 stored in the memory to present data to the user on the display 104 and to accept and process commands from the user via keyboard 108 and mouse device 110.

The present invention is preferably implemented using one or more computer programs or applications through a graphical user interface. These computer programs are depicted as windows 124 presented on the display 104, operating under control of the operating system 122.

Generally, the operating system and the computer programs implementing the present invention are tangibly embodied in a computer-readable medium, e.g. one or more of removable data storage devices 112, 114, such as a zip or floppy disc drive, or fixed data storage devices 130, including for example, a hard drive, CD-ROM drive, or tape drive. Also, the relational databases used with the present invention can be stored in data storage devices 130, 112, 114, or may be stored off-line and accessed via interface cable 120.

Those skilled in the art will recognize that the exemplary environment illustrated in FIG. 1 is not intended to limit the present invention. Indeed, those skilled in the art will recognize that other alternative hardware environments may be used without departing from the scope of the present invention.

2. User Operation

The operation of the present invention is described with reference to FIG. 2 through FIG. 11, which illustrate exemplary embodiments of the user interface aspects of the present invention.

The present invention provides a method for extending rolling ball fillets to the outside boundary curves of two base surfaces, as shown in FIGS. 2, 3, 4 and 5. As described in FIG. 2, a rolling ball fillet 136 is typically created between a first base surface 132 and a second base surface 134. The present invention provides for an extension of the rolling ball fillet 136 via an extended rolling ball fillet 138. As shown in FIG. 3, the present invention also provides for the extension of a variable fillet 140 with an extended variable fillet 142. FIG. 4 illustrates how a rolling ball fillet 148 between a cylindrical surface 144 and planar surface 146 may be extended by an extended fillet 150 according to the present invention. FIG. 5 shows how the present invention may be used to extend a rolling ball fillet 156 by an extended fillet 158 between a first surface 152 and a second surface 154.

Figure 6A:
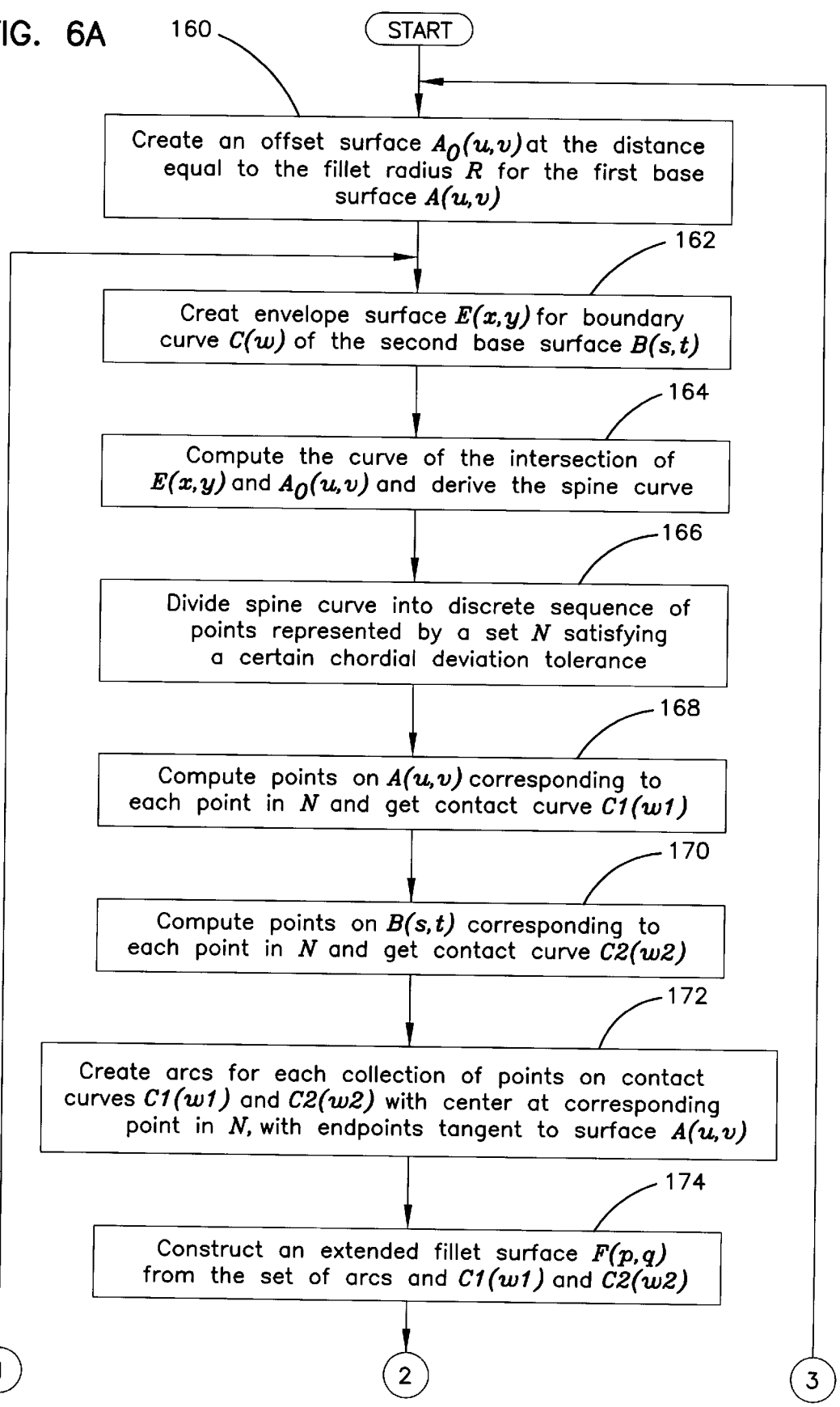
FIGS. 6A and 6B are a flowchart indicating the steps for generating extended rolling ball fillet surfaces in accordance with the present invention.
Figure 6B:
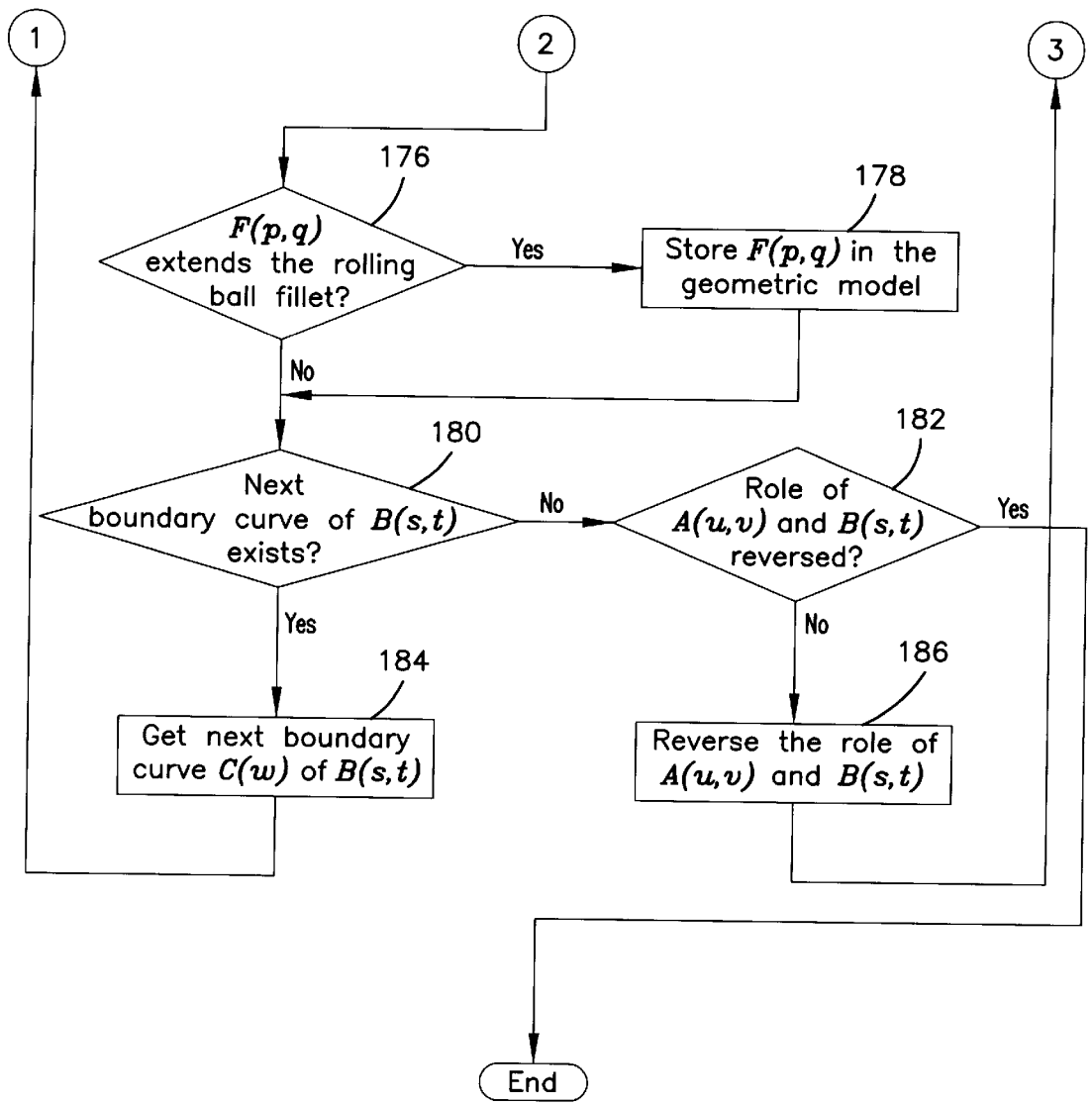
Figure 11:
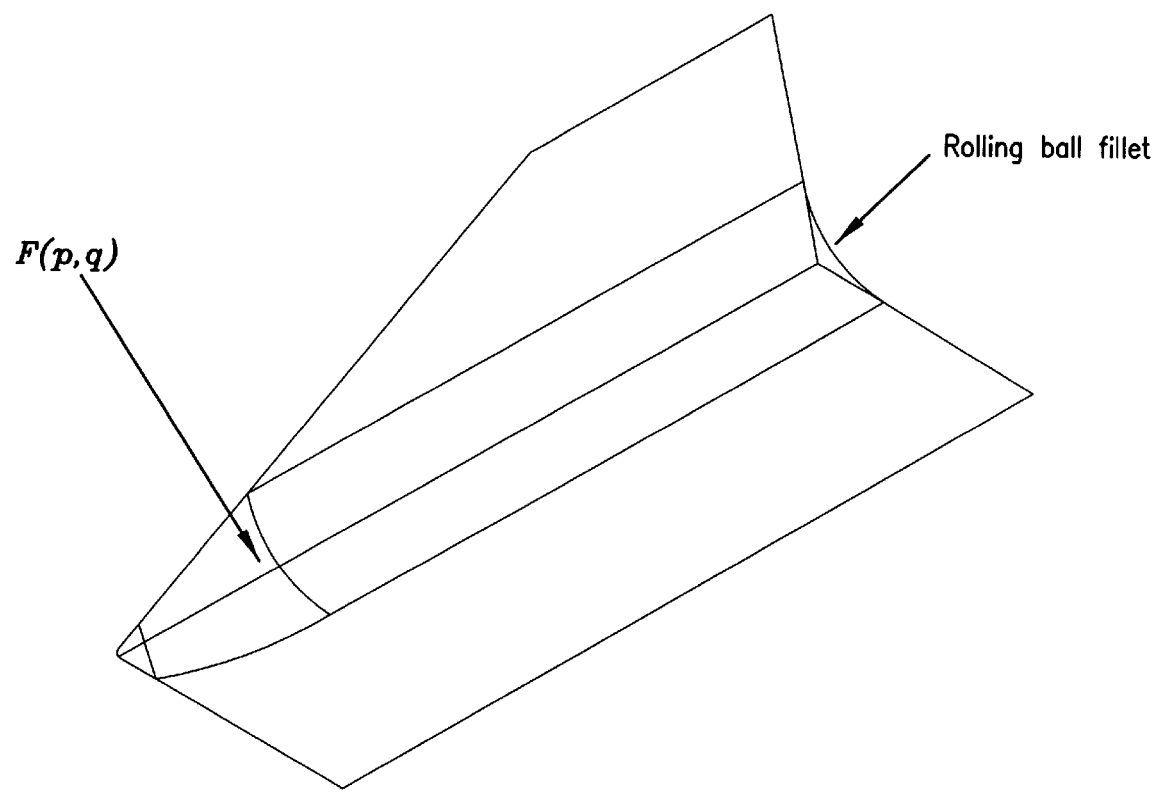
FIG. 11 shows a perspective drawing for generating an extended rolling ball fillet surface compatible with the present invention.

FIGS. 6A and 6B are a flow diagram illustrating the logical operation of the present invention. The process begins with the computer 106 receiving into its memory A(u,v) and B(s,t) as the definition of the two base surfaces, where parameters u,v and s,t are for the surfaces A(u,v) and B(s,t) respectively varying over the finite intervals. It is assumed that a rolling ball fillet surface exists between the two surfaces having a radius R. The present invention then provides for the creation of an extended fillet surface F(p,q) of radius R between A(u,v) and B(s,t) such that the rolling fillet is extended to the boundary of both the surfaces, as shown in FIG. 11.

Figure 7:
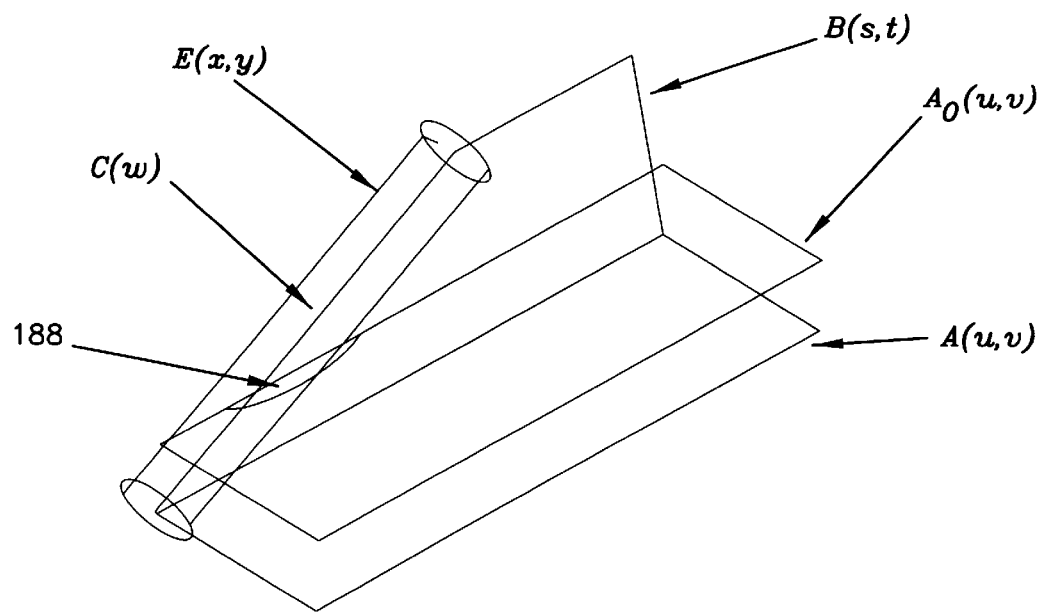
FIG. 7 shows a perspective drawing of generating an offset surface, an envelope surface, and a spine curve compatible with the present invention.

After the two base surfaces have been received into the computer 106, at block 160 in FIG. 6A an offset surface $A_o(u,v)$ is created at the distance R for the base surface A(u,v), as illustrated by FIG. 7. The offset surface $A_o(u,v)$ of surface A(u,v) along its normal by a distance R is given by the relation:

$$A_o(u,v)=A(u,v)+R.A_n(u,v)$$

where $A_n(u,v)$ is the unit normal to the surface A(u,v) at any point u,v. The unit normal is given by the relation:

$$A_n(u, v) = \frac{A_u \times A_v}{|A_u \times A_v|}$$

where $A_u$ and $A_v$ are partial derivatives of surface A(u,v).

At block 162 in FIG. 6A, an envelope surface E(x,y) is created for a boundary curve C(w) of the base surface B(s,t), where w denotes the parameter of the curve as shown by FIG. 7. The envelope surface E(x,y) is preferably created by instances of a ball of radius R with its center moving along the curve C(w). For each value of w there corresponds an instance of the ball. Each instance of the ball intersects the normal plane of the curve C(w) in a circle whose radius equals R, which is equal to the radius of the sphere. This circle is called the "normal section". All instances of the ball lead to a set or sequence of normal sections. The envelope surface E(x,y) may be understood as a spherical duct surface obtained by dragging a circle of radius R along the curve C(w).

At block 164 in FIG. 6A, a spine curve 188 of the intersection of surfaces E(x,y) and $A_o(u,v)$ is computed as in shown in FIG. 7. The spine curve 188 contains a trace of points that simultaneously lie on the $A_o(u,v)$ and E(x,y) surfaces. The vector equation of the spine curve is given by the relation:

$$A_o(u,v)=E(x,y)$$

At block 166 in FIG. 6A, the spine curve 188 is divided into a discrete sequence of K points represented by a set S which satisfies a predetermined chordial deviation tolerance. At block 168 in FIG. 6A, corresponding to each point in S, a set of contact points C1 on the surface A(u,v) is determined according to the following relation:

$$A(u,v) = A_o(u,v) - R \cdot A_{n(u,v)}$$

Figure 8:
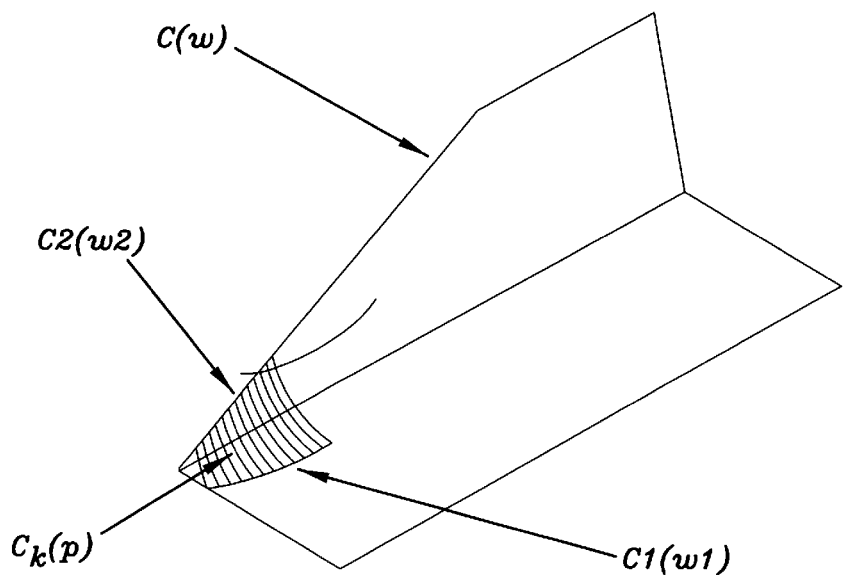
FIG. 8 shows a perspective drawing of generating contact curves and blending splines compatible with the present invention.

It will be recognized that the set of points C1 also lies on the contact curve C1(w1) as shown in FIG. 8.

At block 170 in FIG. 6A, corresponding to each point in S, a set of contact points C2 on the surface B(s,t) is determined according to the following relation:

$$B(s,t) = E(x,y) - R \cdot E_n(x,y)$$

It will be recognized that the set of contact points C2 lies on the contact curve C2(w2), and that the curve C2(w2) is also a subset of the curve C(w), as shown in FIG. 8.

Figure 10:
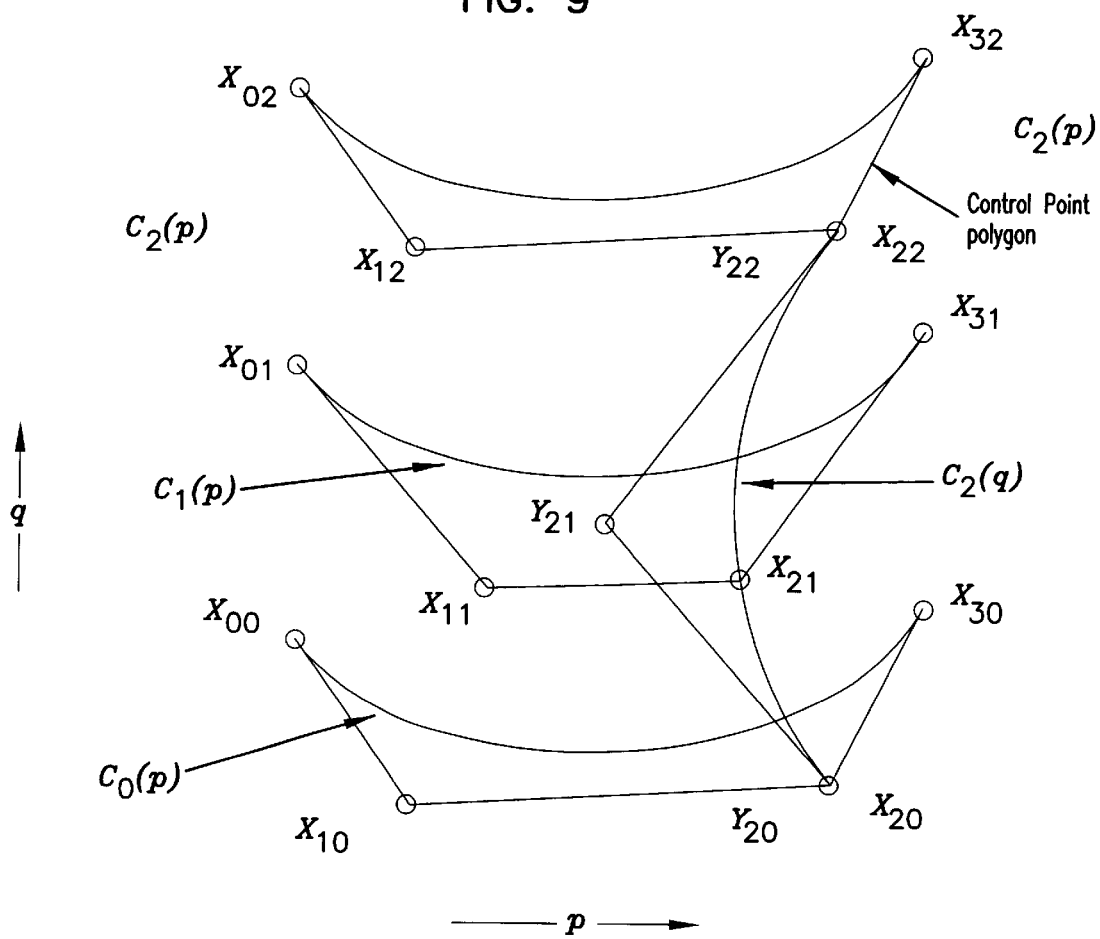
FIG. 10 shows a perspective drawing of a method for interpolating points to obtain spline curves compatible with the present invention.

At block 172 in FIG. 6A, a set of K arcs is preferably created from each collection of points on contact curves C1(w1) and C2(w2) with their center at the corresponding point in S. Each of the arcs is tangent to the surface A(u,v) at one endpoint. It is possible to represent each arc in the set of arcs in the form of a spline segment, as shown in FIG. 10. The set $C_k(p)$ of K spline segments, each of degree d, polynomial $N_{i,d}(p)$ and control points $X_{i,k}$ can be represented by the following relation:

$$C_k(p) = \sum_{i=0}^{n} X_{i,k} N_{i,d}(p), k = 0, \ldots K.$$

Figure 9:
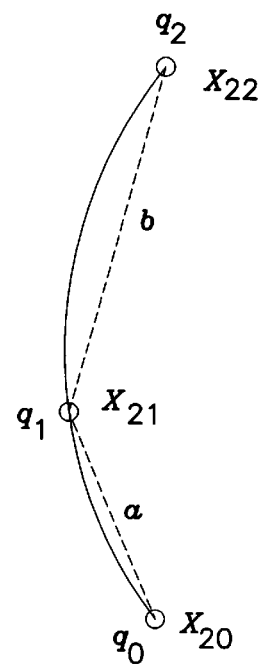
FIG. 9 shows a drawing of a centripetal method for computing the parameter values of a spline curve compatible with the present invention.

At block 174 in FIG. 6A, an extended fillet surface F(p,q) is constructed from the spline segments $C_k(p)$ in three steps. In the first step, a q parameter value for the spline segments in set $C_k(p)$ is computed such that $F(p,q_k)=C_k(p)$. This step assumes that the spline segments are iso-parametric in the p-direction. A centripetal method, as shown in FIG. 9, may be used according to the following relation:

$$q_0 = 0, q_i = q_{i-1} + \frac{\sqrt{|X_i - X_{i-1}|}}{\sum_{j=1}^{n} \sqrt{|X_j - X_{j-1}|}}, q_{n=1}.$$

In the second step, as shown in FIG. 10, the control points $X_{i,k}$ are interpolated from k=0, . . . K for each i, i=0, . . . n to determine curves $C_i(q)$ according to the following relation:

$$C_i(q) = \sum_{j=0}^{m} Y_{i,j} N_{j,d}(q).$$

In the third step, points $Y_{i,j}$ are defined as the control points of the extended fillet surface according to the following relation:

$$F(p, q) = \sum_{i=0}^{n} \sum_{j=0}^{m} Y_{i,j} N_{i,d}(p) N_{j,d}(q)$$

defined over the knot vectors P and Q and degree d in the p and q direction, as shown in FIG. 11. The proof that the surface F(p,q) interpolates the set of splines $C_k(p)$ can be shown as follows:

$$\begin{aligned}
F(p, q) &= \sum_{i=0}^{n} \left( \sum_{j=0}^{m} Y_{i,j} N_{j,d}(q_k) \right) N_{i,d}(p) \\
&= \sum_{i=0}^{n} C_i(q_k) N_{i,d}(p) \\
&= \sum_{i=0}^{n} X_{i,k} N_{i,d}(p) \\
&= C_k(p)
\end{aligned}$$

If in FIG. 6B at decision point 176 it is determined that one of the boundary curves of the surface F(p,q) is identical to one of the boundary curves of the rolling ball fillet, then the surface F(p,q) is an extended fillet and it is stored in the geometric model at block 178.

If at decision point 180 in FIG. 6B there are further boundary curves of B(s,t), the system obtains the next boundary curve at block 184 and flow control then returns to block 162. If at decision point 176 there are no further boundary curves of B(s,t), and if at decision point 182 it is determined that the role of A(u,v) and B(s,t) has not been reversed, the role of A(u,v) and B(s,t) is reversed at block 186 and flow control returns to block 160. Otherwise, the procedure terminates.

Figure 3A:
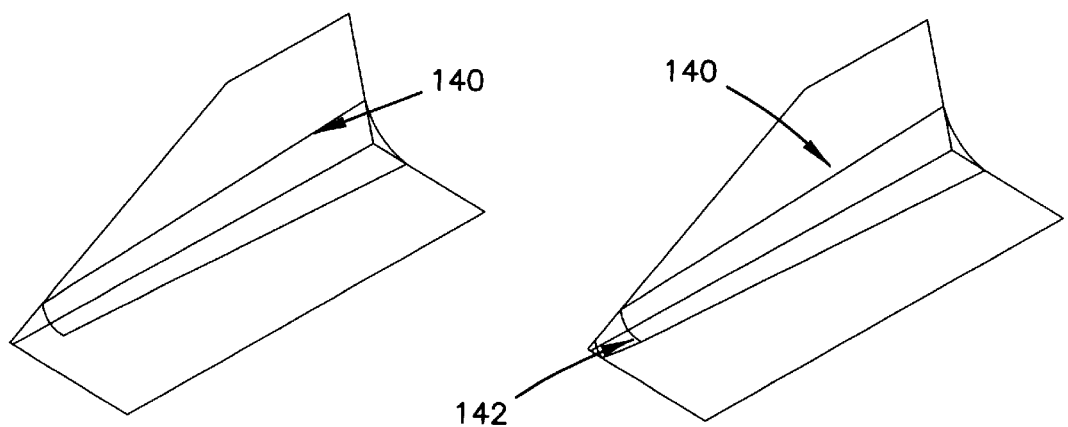
FIG. 3 is a perspective drawing which shows a variable rolling ball fillet created by existing techniques and an extended variable fillet compatible with the present invention.
Figure 3B:
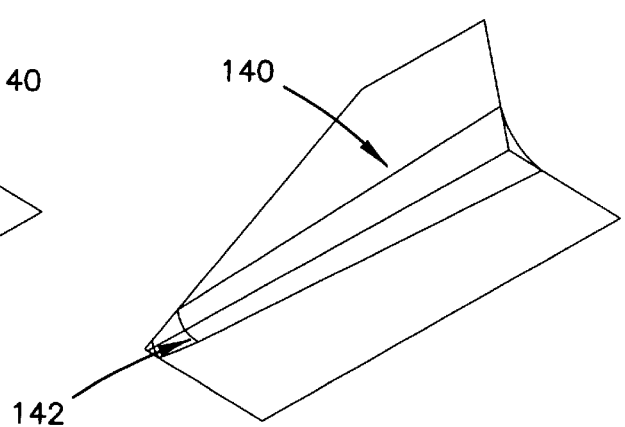

It will be recognized that the present invention is not limited to the embodiments described above. Variations and modifications may be made without departing from the scope of the present invention. For example, an extended fillet can also be created for variable fillets as shown in FIGS. 3A and 3B. Further, the three step process for creating an extended fillet surface from spline segments can be replaced by other methods depending upon the type of surface being created. It will also be recognized that the present invention works for untrimmed as well as trimmed surfaces. The continuity between the rolling ball fillet and extended fillet can further be improved by blending the two surfaces along the common natural boundary. The envelope surface can also be a portion of the spherical duct surface obtained by dragging an arc, instead of a circle as described above.

In conclusion, the foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating an extended fillet surface with a computer which smoothly connects a first base surface and a second base surface together, the computer having a processor, data storage device, display device, and data input device, the method comprising the steps of:

(a) creating an offset surface for the first base surface at a distance equal to a fillet radius;

(b) creating an envelope surface for a boundary curve of the second base surface;

(c) determining an intersection between the offset surface and the envelope surface;

(d) creating a spine curve of the intersection;

(e) projecting a first contact curve onto the first base surface according to the spine curve;

(f) projecting a second contact curve onto the second base surface according to the spine curve;

(g) creating a set of arcs between the first contact curve and the second contact curve, wherein an endpoint of each arc within the set of arcs is tangent to the first base surface; and (h) constructing the extended fillet surface from the set of arcs.

2. The method of claim 1, wherein the offset surface is normal to the first base surface.

3. The method of claim 1, wherein the envelope surface has a substantially circular cross section.

4. The method of claim 1, wherein the spine curve comprises a sequence of points having a chordial deviation tolerance.

5. The method of claim 1, wherein each of the set of arcs comprises spline segments defined by the relation:

$$C_k(p) = \sum_{i=0}^{n} X_{i,k} N_{i,d}(p), k = 0, \ldots K$$

wherein $C_k(p)$ represents the set of arcs, K represents the number of spline segments, d represents a degree of the spline segments, $X_{i,k}$ represent the control points of the spline segments, and $N_{i,d}(p)$ represents a polynomial.

6. The method of claim 5, wherein the step of constructing the extended fillet surface comprises the steps of:

(a) creating a q parameter value for the spline segments in set $C_k(p)$ according to the relation:

$$q_0 = 0, q_i = q_{i-1} + \frac{\sqrt{|X_i - X_{i-1}|}}{\sum_{j=1}^{n} \sqrt{|X_j - X_{j-1}|}}, q_{n=1}$$

wherein $F(p, q_k) = C_k(p)$;

(b) interpolating $X_{i,k}$, k=0, ... K for each i=0, ... n to create curves $C_i(q)$ according to the relation:

$$C_i(q) = \sum_{j=0}^{m} Y_{i,j} N_{j,d}(q); \text{ and}$$

(c) deriving the extended fillet surface with control points $Y_{i,j}$ according to the relation:

$$F(p, q) = \sum_{i=0}^{n} \sum_{j=0}^{m} Y_{i,j} N_{i,d}(p) N_{j,d}(q)$$

defined over vectors P and Q and degree d in a p and q direction.

7. An apparatus for generating an extended fillet surface with a computer which smoothly connects a first base surface and a second base surface together, the apparatus comprising:

(a) a computer, comprising a processor and a memory storing the first base surface and the second base surface;

(b) means, performed by the computer, for creating an offset surface for the first base surface at a distance equal to a fillet radius;

(c) means, performed by the computer, for creating an envelope surface for a boundary curve of the second base surface;

(d) means, performed by the computer, for determining an intersection between the offset surface and the envelope surface;

(e) means, performed by the computer, for creating a spine curve of the intersection;

(f) means, performed by the computer, for projecting a first contact curve onto the first base surface according to the spine curve;

(g) means, performed by the computer, for projecting a second contact curve onto the second base surface according to the spine curve;

(h) means, performed by the computer, for creating a set of arcs between the first contact curve and the second contact curve, wherein an endpoint of each arc within the set of arcs is tangent to the first base surface; and (i) means, performed by the computer, for constructing the extended fillet surface from the set of arcs.

8. The apparatus of claim 7, wherein the offset surface is normal to the first base surface.

9. The apparatus of claim 7, wherein the envelope surface has a substantially circular cross section.

10. The apparatus of claim 7, wherein the spine curve comprises a sequence of points having a chordial deviation tolerance.

11. The apparatus of claim 7, wherein each of the set of arcs comprises spline segments defined by the relation:

$$C_k(p) = \sum_{i=0}^{n} X_{i,k} N_{i,d}(p), k = 0, \ldots K$$

wherein $C_k(p)$ represents the set of arcs, K represents the number of spline segments, d represents a degree of the spline segments, $X_{i,k}$ represent the control points of the spline segments, and $N_{i,d}(p)$ represents a polynomial.

12. The apparatus of claim 11, wherein the means for constructing the extended fillet surface comprises:

(a) means, performed by the computer, for creating a q parameter value for the spline segments in set $C_k(p)$ according to the relation:

$$q_0 = 0, q_i = q_{i-1} + \frac{\sqrt{|X_i - X_{i-1}|}}{\sum_{j=1}^{n} \sqrt{|X_j - X_{j-1}|}}, q_{n=1}$$

wherein $F(p, q_k) = C_k(p)$;

(b) means, performed by the computer, for interpolating $X_{i,k}$, k=0, ... K for each i=0, ... n to create curves $C_i(q)$ according to the relation:

$$C_i(q) = \sum_{j=0}^{m} Y_{i,j} N_{j,d}(q); \text{ and}$$

(c) means, performed by the computer, for deriving the extended fillet surface with control points $Y_{i,j}$ according to the relation:

$$F(p, q) = \sum_{i=0}^{n} \sum_{j=0}^{m} Y_{i,j} N_{i,d}(p) N_{j,d}(q)$$

defined over vectors P and Q and degree d in a p and q direction.

13. A computer-readable medium tangibly embodying one or more computer programs that when retrieved and executed by a computer causes the computer to perform method steps of generating an extended fillet surface with a computer which smoothly connects a first base surface and a second base surface together, the method steps comprising:

(a) creating an offset surface for the first base surface at a distance equal to a fillet radius;

(b) creating an envelope surface for a boundary curve of the second base surface;

(c) determining an intersection between the offset surface and the envelope surface;

(d) creating a spine curve of the intersection;
(e) projecting a first contact curve onto the first base surface according to the spine curve;
(f) projecting a second contact curve onto the second base surface according to the spine curve;
(g) creating a set of arcs between the first contact curve and the second contact curve, wherein an endpoint of each arc within the set of arcs is tangent to the first base surface; and
(h) constructing the extended fillet surface from the set of arcs.

14. The computer-readable medium of claim 13, wherein the offset surface is normal to the first base surface.

15. The computer-readable medium of claim 13, wherein the envelope surface has a substantially circular cross section.

16. The computer-readable medium of claim 13, wherein the spine curve comprises a sequence of points having a chordial deviation tolerance.

17. The computer-readable medium of claim 13, wherein each of the set of arcs comprises spline segments defined by the relation:

$$C_k(p) = \sum_{i=0}^{n} X_{i,k} N_{i,d}(p), k = 0, \ldots K$$

wherein $C_k(p)$ represents the set of arcs, K represents the number of spline segments, d represents a degree of the spline segments, $X_{i,k}$ represent the control points of the spline segments, and $N_{i,d}(p)$ is a polynomial.

18. The computer-readable medium of claim 17, wherein the step of constructing the extended fillet surface comprises the steps of:

(a) creating a q parameter value for the spline segments in set $C_k(p)$ according to the relation:

$$q_0 = 0, q_i = q_{i-1} + \frac{\sqrt{|X_i - X_{i-1}|}}{\sum_{j=1}^{n} \sqrt{|X_j - X_{j-1}|}}, q_{n=1}$$

wherein $F(p, q_k) = C_k(p)$;

(b) interpolating $X_{i,k}$, k=0, ... K for each i=0, ... n to create curves $C_i(q)$ according to the relation:

$$C_i(q) = \sum_{j=0}^{m} Y_{i,j} N_{j,d}(q); \text{ and}$$

(c) deriving the extended fillet surface with control points $Y_{i,j}$ according to the relation:

$$F(p, q) = \sum_{i=0}^{n} \sum_{j=0}^{m} Y_{i,j} N_{i,d}(p) N_{j,d}(q)$$

defined over vectors P and Q and degree d in a p and q direction.

* * * * *

UNITED STATES PATENT AND TRADEMARK OFFICE
CERTIFICATE OF CORRECTION

PATENT NO. : 5,774,359

DATED : June 30, 1998

INVENTOR(S) : Sanjeev K. Taneja

It is certified that error appears in the above-identified patent and that said Letters Patent is hereby corrected as shown below:

Column 1, line 38, after "1992 [HERMANN];" begin a new paragraph with "Klass, R., et al., 'Fillet and surface".

Figure 2A:
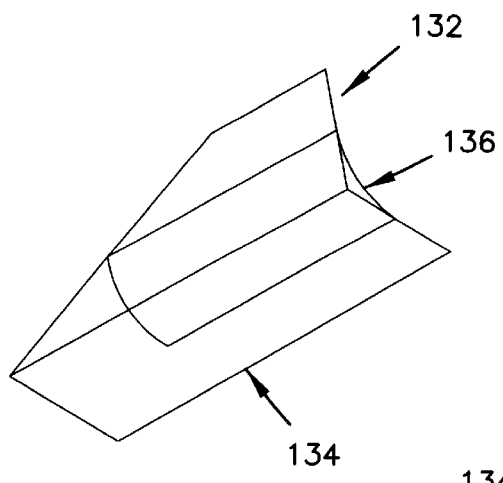
FIG. 2 is a perspective drawing which shows a rolling ball fillet created by existing techniques and an extended fillet compatible with the present invention.
Figure 2B:
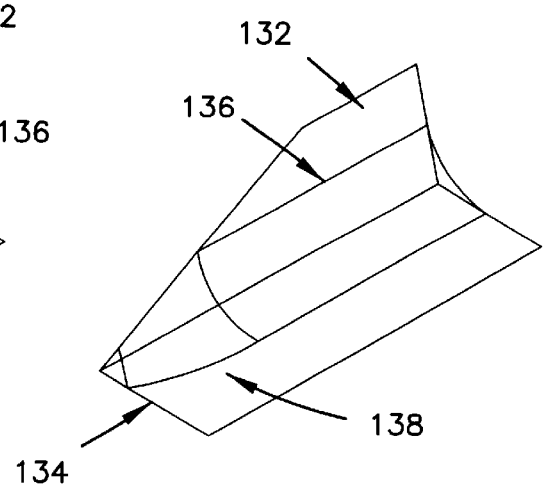

Column 2, line 7, after "in" change "FIG. 1A, FIG. 2A, Fig. 3A" to --FIGS. 1, 2, 3--.

Column 2, line 8, after "and" change "FIG. 4A" to --4--.

Column 4, line 62, after "as" strike "in".

Column 6, line 29, change "FIGS. 3A and 3B" to --Fig. 3--.

Signed and Sealed this

Twenty-third Day of March, 1999

Attest:

Q. TODD DICKINSON

*Attesting Officer*   *Acting Commissioner of Patents and Trademarks*